(12) United States Patent
Tian et al.

(10) Patent No.: US 10,602,064 B2
(45) Date of Patent: Mar. 24, 2020

(54) PHOTOGRAPHING METHOD AND PHOTOGRAPHING DEVICE OF UNMANNED AERIAL VEHICLE, UNMANNED AERIAL VEHICLE, AND GROUND CONTROL DEVICE

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 47 days.

(21) Appl. No.: 15/990,635

(22) Filed: May 27, 2018

(65) Prior Publication Data
US 2018/0278844 A1    Sep. 27, 2018

(30) Foreign Application Priority Data
May 27, 2017    (CN) .......................... 2017 1 0389194

(51) Int. Cl.
| | | |
|---|---|---|
| *H04N 5/00* | (2011.01) | |
| *G05D 1/00* | (2006.01) | |
| *H04N 5/232* | (2006.01) | |
| *B64C 39/02* | (2006.01) | |

(52) U.S. Cl.
CPC ....... *H04N 5/23245* (2013.01); *G05D 1/0094* (2013.01); *H04N 5/232* (2013.01); *H04N 5/23203* (2013.01); *H04N 5/23238* (2013.01); *B64C 39/024* (2013.01); *B64C 2201/127* (2013.01)

(58) Field of Classification Search
CPC .......................... H04N 5/23245; G05D 1/0094
USPC ....................................................... 348/144
See application file for complete search history.

(56) References Cited

U.S. PATENT DOCUMENTS

2016/0309339 A1* 10/2016 Priest .................... H04W 24/08
2018/0046188 A1*  2/2018 Hwang .................. B64C 39/02

* cited by examiner

*Primary Examiner* — Jeffery A Williams

(57) ABSTRACT

A photographing method and a photographing device of an unmanned aerial vehicle, the unmanned aerial vehicle, and a ground control device are provided. The method includes steps of: receiving a photographing instruction of the unmanned aerial vehicle; selecting a photographing model of the unmanned aerial vehicle, wherein the photographing model includes a photographing object and a photographing mode of the unmanned aerial vehicle which are correlated with each other; when the photographing object corresponding to the photographing model of the unmanned aerial vehicle is identified to exist in a captured image, adopting the photographing mode correlated to the photographing object of the unmanned aerial vehicle, for adjusting a flight condition of the unmanned aerial vehicle and for photographing the photographing object of the unmanned aerial vehicle. The present invention enables the unmanned aerial vehicle to automatically capture image data of ideal effect.

7 Claims, 10 Drawing Sheets

S310

When a photographing object corresponding to at least one photographing model of unmanned aerial vehicle is identified to exist in a captured image of the unmanned aerial vehicle and a current photographing environmental condition of the unmanned aerial vehicle is detected to meet a photographing environmental condition corresponding to at least one photographing model of the unmanned aerial vehicle, adopting a photographing mode correlated to the photographing environmental condition for adjusting a flight condition of the unmanned aerial vehicle and for photographing the photographing object of the unmanned aerial vehicle

When a photographing object corresponding to at least one photographing model of unmanned aerial vehicle is identified to exist in a captured image of the unmanned aerial vehicle and a current photographing object of the unmanned aerial vehicle is detected to meet a photographing object condition corresponding to at least one photographing model of the unmanned aerial vehicle, adopting a photographing mode correlated to the photographing object condition for adjusting a flight condition of the unmanned aerial vehicle and for photographing the photographing object of the unmanned aerial vehicle

FIG. 4

Unmanned aerial vehicle 900

Fourth photographing device 800 of unmanned aerial vehicle

FIG. 9

Ground control device 1000 for unmanned aerial vehicle

Fourth photographing device 800 of unmanned aerial vehicle

FIG. 10

PHOTOGRAPHING METHOD AND PHOTOGRAPHING DEVICE OF UNMANNED AERIAL VEHICLE, UNMANNED AERIAL VEHICLE, AND GROUND CONTROL DEVICE

CROSS REFERENCE OF RELATED APPLICATION

The application claims priority under 35 U.S.C. 119(a-d) to CN 201710389194.2, filed May 27, 2017.

BACKGROUND OF THE PRESENT INVENTION

Field of Invention

The present invention relates to a technical filed of photographing, and more particularly to a photographing method and a photographing device of an unmanned aerial vehicle, the unmanned aerial vehicle and a ground control device.

Description of Related Arts

Aerial photographing of the unmanned aerial vehicle is to obtain information through an onboard remote sensing device such as the high resolution CCD (charge-coupled device) digital camera, the light optical camera, the infrared scanner, the laser scanner and the magnetometer with the unmanned aerial vehicle as an aerial platform, then process the image information by the computer, and produce the information into the image according to certain accuracy requirements. The unmanned aerial vehicle system has outstanding characteristics in the combination of design and optimization, and is an application technology integrated with high-altitude photographing, remote control and measuring technology, video image microwave transmission and computer image processing.

The aerial photo of the unmanned aerial vehicle has advantages of high definition, large scale and small area, and the unmanned aerial vehicle is especially suitable for aerial photographing of the strip region (such as the highway, railway, river, reservoir and coastline). Moreover, the unmanned aerial vehicle brings convenience to the aerial photographing and is a remote sensing platform that easily moves to another site. There is little site limitation on taking off and landing of the unmanned aerial vehicle that the unmanned aerial vehicle can take off and land at the playground, highway or other relative wide ground. The unmanned aerial vehicle has a high stability and a good safety, and is easy to move to another site for photographing.

For the conventional photographing of the unmanned aerial vehicle, it needs to select an object to be photographed manually through a display device of the ground station and then control the unmanned aerial vehicle to photograph. In the above photographing control manner, because of the limitations of the identification experience on the photographing object and the control accuracy, it is difficult to capture an image of ideal effect.

SUMMARY OF THE PRESENT INVENTION

An object of the present invention is to provide a photographing method and a photographing device of an unmanned aerial vehicle, the unmanned aerial vehicle and a ground control device, so that the unmanned aerial vehicle is able to automatically capture image data of ideal effect.

Firstly, the present invention provides a photographing method of an unmanned aerial vehicle, comprising steps of:

selecting a photographing model of the unmanned aerial vehicle, wherein the photographing model of the unmanned aerial vehicle includes a photographing object and a photographing mode of the unmanned aerial vehicle which are correlated with each other; and when the photographing object corresponding to the photographing model of the unmanned aerial vehicle is identified to exist in a captured image, adopting the photographing mode correlated to the photographing object of the unmanned aerial vehicle for adjusting a flight condition and for photographing the photographing object of the unmanned aerial vehicle.

Secondly, the present invention provides a first photographing device of the unmanned aerial vehicle, comprising a selecting unit and an identifying and photographing unit; wherein:

the selecting unit is for selecting the photographing model of the unmanned aerial vehicle, wherein the photographing model of the unmanned aerial vehicle includes the photographing object and the photographing mode of the unmanned aerial vehicle which are correlated with each other; and the identifying and photographing unit is for adjusting the flight condition of the unmanned aerial vehicle with the photographing mode correlated to the photographing object of the unmanned aerial vehicle when the photographing object corresponding to the photographing model of the unmanned aerial vehicle is identified to exist in the captured image of the unmanned aerial vehicle, and for photographing the photographing object of the unmanned aerial vehicle.

Thirdly, the present invention provides a second photographing device of the unmanned aerial vehicle, comprising a memory and a processor, wherein:

the memory is for storing an executable program code; and the processor is for reading the executable program code stored in the memory and executing the above photographing method of the unmanned aerial vehicle.

Fourthly, the present invention provides an unmanned aerial vehicle, comprising one of the above photographing devices of the unmanned aerial vehicle.

Fifthly, the present invention provides a ground control device for the unmanned aerial vehicle, comprising one of the above photographing devices of the unmanned aerial vehicle.

According to the photographing method and photographing device of the unmanned aerial vehicle, the unmanned aerial vehicle and the ground control device provided by the present invention, through selecting the photographing model of the unmanned aerial vehicle, including the correlated photographing object and photographing mode of the unmanned aerial vehicle, the unmanned aerial vehicle can identify the collected image during flight; when the object selected to be photographed is identified to exist in the captured image, the photographing mode correlated to the photographing object of the unmanned aerial vehicle is adopted for adjusting the flight condition of the unmanned aerial vehicle and for photographing the photographing object of the unmanned aerial vehicle. When photographing of the unmanned aerial vehicle is manually controlled, the photographing object requires to be selected by experience, and thus an image of ideal effect is difficult to be captured; through the present invention, the above problem is avoided.

Moreover, compared with the manual control, the control accuracy of the present invention is greatly increased, thereby improving the photographing effect of the image.

BRIEF DESCRIPTION OF THE DRAWINGS

In order to illustrate the technical solutions of the embodiments of the present invention more clearly, the accompanying drawings referenced in the embodiments are described briefly as follows. Obviously, the following described accompanying drawings are merely some embodiments of the present invention. One skilled in the art can derive other drawings from the accompanying drawings without creative efforts.

FIG. 3 is a flow chart of a third photographing method of the unmanned aerial vehicle according to the preferred embodiment of the present invention.

FIG. 4 is a flow chart of a fourth photographing method of the unmanned aerial vehicle according to the preferred embodiment of the present invention.

FIG. 9 is a sketch structural view of the unmanned aerial vehicle according to the preferred embodiment of the present invention.

FIG. 10 is a sketch structural view of a ground control device for the unmanned aerial vehicle according to the preferred embodiment of the present invention.

DETAILED DESCRIPTION OF THE PREFERRED EMBODIMENT

Features of various aspects and embodiments of the present invention are described in detail as follows. In the following detailed description, many details are showed, so as to provide a comprehensive understanding of the present invention. However, it is obvious for one skilled in the art that the present invention can be implemented with omitting some details. The following description of the embodiments is merely for providing a better understanding of the present invention through showing examples of the present invention.

It should be noted that the embodiments and the features in the embodiments of the present invention can be combined with each other as long as no conflict exists. The preferred embodiment of the present invention is described in detail with the accompanying drawings as follows.

Figure 1:
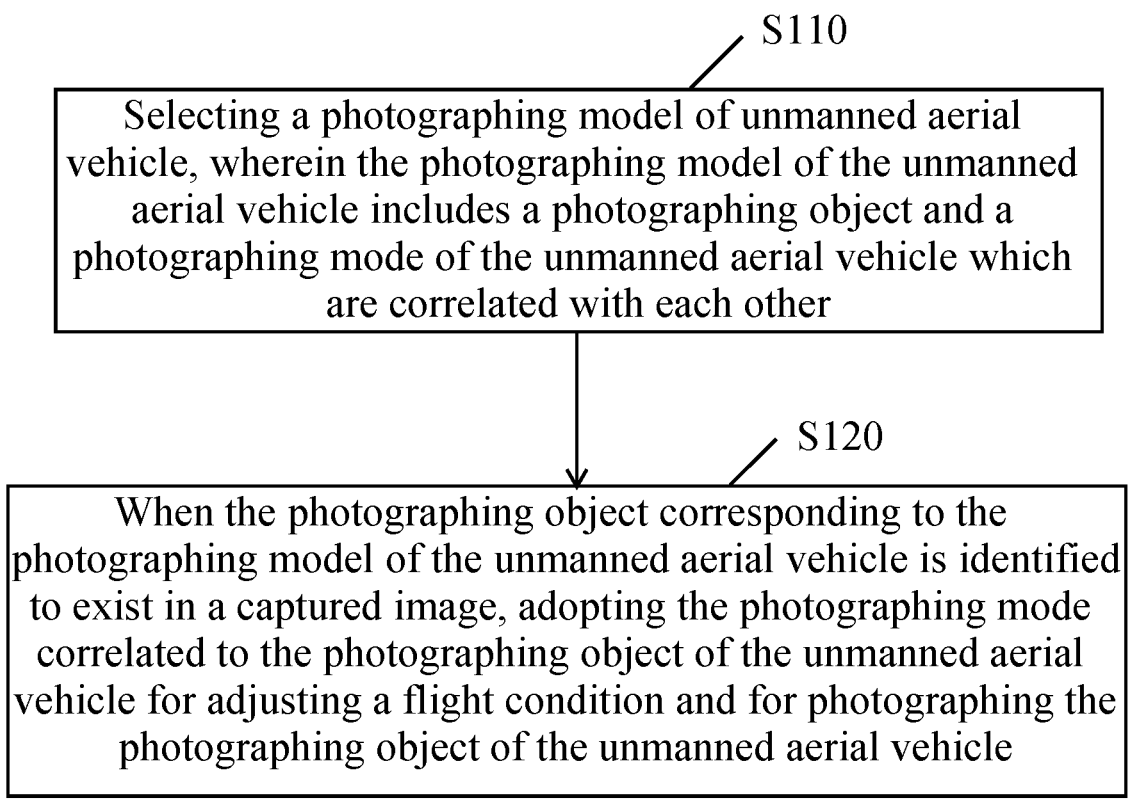
FIG. 1 is a flow chart of a first photographing method of an unmanned aerial vehicle according to a preferred embodiment of the present invention.

FIG. 1 is a flow chart of a first photographing method of an unmanned aerial vehicle according to the preferred embodiment of the present invention. As shown in FIG. 1, the first photographing method of the unmanned aerial vehicle comprises steps of:

(S110), selecting a photographing model of the unmanned aerial vehicle, wherein the photographing model of the unmanned aerial vehicle includes a photographing object and a photographing mode of the unmanned aerial vehicle which are correlated with each other; wherein:

in some embodiments, the selected photographing model of the unmanned aerial vehicle can be a preset photographing model of the unmanned aerial vehicle, a photographing model of the unmanned aerial vehicle received in various ways, and a photographing model of the unmanned aerial vehicle containing identification information that can identify functions of the photographing model of the unmanned aerial vehicle;

in some embodiments, the photographing object of the unmanned aerial vehicle can be human, animal, mountain, tree, river and so on; each type of the photographing object has different features, such as contour features, motion features and color features; according to the preset features, an image captured by the unmanned aerial vehicle can be identified and judged;

in some embodiments, the photographing mode of the unmanned aerial vehicle can be a photographing mode which combines movement of the unmanned aerial vehicle with parameter adjustment of a photographing device; for example, when the unmanned aerial vehicle is moving or keeps still, the unmanned aerial vehicle photographs the photographing object from far to near or from near to far with zooming; the unmanned aerial vehicle can also photograph the photographing object with rotation in the air for omnidirectional and panoramic photographing, or photograph with following the movement of the photographing object;

(S120), when the photographing object corresponding to the photographing model of the unmanned aerial vehicle is identified to exist in the captured image, adopting the photographing mode correlated to the photographing object of the unmanned aerial vehicle for adjusting a flight condition and for photographing the photographing object of the unmanned aerial vehicle; wherein:

in some embodiments, according to the preset features of the photographing object of the unmanned aerial vehicle, such as the contour features, the motion features and the color features, the image captured by the unmanned aerial vehicle is identified;

in some embodiments, the photographing mode correlated to the photographing object of the unmanned aerial vehicle is adopted for adjusting the flight condition of the unmanned aerial vehicle and for photographing the photographing object of the unmanned aerial vehicle; the unmanned aerial vehicle can photograph the photographing object with rotation in the air for omnidirectional and panoramic photographing, or photograph with following the movement of the photographing object; that is to say, the photographing object is photographed with a photographing mode which combines the movement of the unmanned aerial vehicle with the parameter adjustment of the photographing device;

in some embodiments, when the photographing object corresponding to at least one photographing model of the unmanned aerial vehicle is identified to exist in the captured image of the unmanned aerial vehicle, the photographing mode correlated to the photographing object of the unmanned aerial vehicle is adopted for adjusting the flight condition of the unmanned aerial vehicle and for photographing the photographing object of the unmanned aerial vehicle;

in some embodiments, the unmanned aerial vehicle transmits the image captured by the unmanned aerial vehicle to a ground control device in real-time; when the photographing object corresponding to at least one photographing model of the unmanned aerial vehicle is identified to exist in the captured image of the unmanned aerial vehicle, the photographing mode correlated to the photographing object of the unmanned aerial vehicle is adopted for adjusting the flight condition of the unmanned aerial vehicle and for photographing the photographing object of the unmanned aerial vehicle;

in some embodiments, when the photographing object corresponding to at least one photographing model of the unmanned aerial vehicle is identified to exist in the captured image of the unmanned aerial vehicle, information including the photographing object of the unmanned aerial vehicle is transmitted to the ground control device; then, the ground control device sends a control instruction including the photographing mode correlated to the photographing object of the unmanned aerial vehicle to the unmanned aerial vehicle, so as to adjust the flight condition of the unmanned aerial vehicle and photograph the photographing object of the unmanned aerial vehicle;

thus, according to the first photographing method of the unmanned aerial vehicle provided by the preferred embodiment of the present invention, through selecting the photographing model of the unmanned aerial vehicle, including the correlated photographing object and photographing mode of the unmanned aerial vehicle, the unmanned aerial vehicle can identify the collected image during flight; when the object selected to be photographed is identified to exist in the captured image, the photographing mode correlated to the photographing object of the unmanned aerial vehicle is adopted for adjusting the flight condition of the unmanned aerial vehicle and for photographing the photographing object of the unmanned aerial vehicle. When photographing of the unmanned aerial vehicle is manually controlled, the photographing object requires to be selected by experience, and thus an image of ideal effect is difficult to be captured; through the present invention, the above problem is avoided. Moreover, compared with the manual control, the control accuracy of the present invention is greatly increased, thereby improving the photographing effect of the image; and in some embodiments, one photographing object of the unmanned aerial vehicle in the first photographing method of the unmanned aerial vehicle can correspond to at least two photographing modes of the unmanned aerial vehicle.

Figure 2:
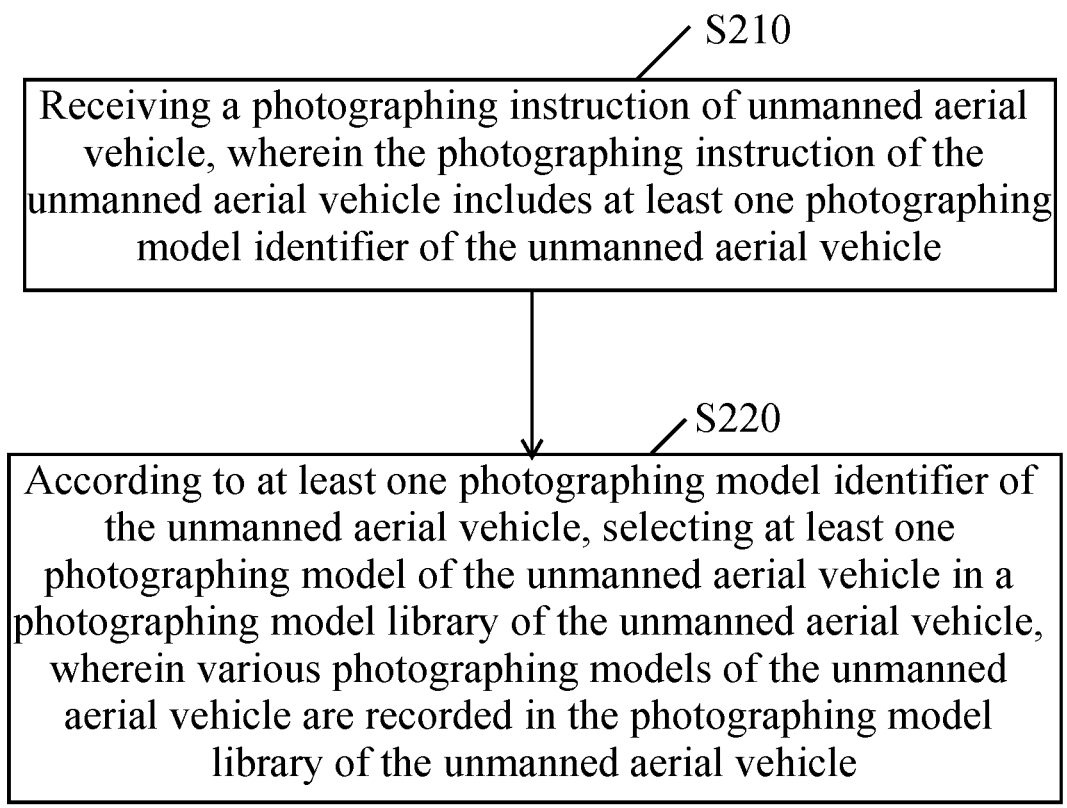
FIG. 2 is a flow chart of a second photographing method of the unmanned aerial vehicle according to the preferred embodiment of the present invention.

FIG. 2 is a flow chart of a second photographing method of the unmanned aerial vehicle according to the preferred embodiment of the present invention. As shown in FIG. 2, the second photographing method of the unmanned aerial vehicle comprises steps of:

(S210), receiving a photographing instruction of the unmanned aerial vehicle, wherein the photographing instruction of the unmanned aerial vehicle includes at least one photographing model identifier of the unmanned aerial vehicle; and (S220), according to at least one photographing model identifier of the unmanned aerial vehicle, selecting at least one photographing model of the unmanned aerial vehicle in a photographing model library of the unmanned aerial vehicle, wherein various photographing models of the unmanned aerial vehicle are recorded in the photographing model library of the unmanned aerial vehicle.

In some embodiments, the photographing instruction of the unmanned aerial vehicle in the step of (S210) comes from the ground control device.

For example, the photographing instruction of the unmanned aerial vehicle can be selected at a display interface of the ground control device, and can also be sent to the unmanned aerial vehicle based on wireless communication after being selected by a user at the ground control device.

In some embodiments, the photographing instruction of the unmanned aerial vehicle in the step of (S210) includes at least one photographing model identifier of the unmanned aerial vehicle arranged in a predetermined sequence.

The step of (S220) particularly comprises steps of: according to at least one photographing model identifier of the unmanned aerial vehicle arranged in the predetermined sequence, selecting at least one photographing model of the unmanned aerial vehicle in the photographing model library of the unmanned aerial vehicle.

In some embodiments, the user can specify a sequence of the multiple photographing models of the unmanned aerial vehicle which are arranged in the predetermined sequence and executed by the unmanned aerial vehicle.

In some embodiments, the photographing effect required by the user can be completed through combining multiple photographing models of the unmanned aerial vehicle arranged in sequence.

In some embodiments, the step of (S120) particularly comprises steps of: when the photographing object corresponding to the photographing model of the unmanned aerial vehicle is identified to exist in the captured image, adopting the photographing mode correlated to the photographing object of the unmanned aerial vehicle; automatically adjusting the flight condition by the unmanned aerial vehicle; photographing the photographing object of the unmanned aerial vehicle, and collecting audio data.

In some embodiments, after the step of (S120), the image data of the photographing object, captured by the unmanned aerial vehicle, is stored after screening according to a predetermined condition.

In some embodiments, the image data of the photographing object, captured by the unmanned aerial vehicle, is image data of ten frames, and it is possible to merely reserve the image data of a specific part. For example, it is possible to merely reserve the image data of $5^{th}$-$8^{th}$ or reserve the image data of $1^{st}$, $3^{rd}$, $5^{th}$, $7^{th}$ and $9^{th}$ frames, so as to compress the stored image data.

FIG. 3 is a flow chart of a third photographing method of the unmanned aerial vehicle according to the preferred embodiment of the present invention. As shown in FIG. 3, the photographing model of the unmanned aerial vehicle further includes a photographing environmental condition correlated to the photographing mode of the unmanned aerial vehicle. The photographing environmental condition includes photographing environmental features such as features of light and brightness.

In some embodiments, the third photographing method of the unmanned aerial vehicle comprises steps of:

(S310), when the photographing object corresponding to at least one photographing model of the unmanned aerial vehicle is identified to exist in the captured image of the unmanned aerial vehicle and a current photographing environmental condition of the unmanned aerial vehicle is detected to meet the photographing environmental condition corresponding to at least one photographing model of the unmanned aerial vehicle, adopting the photographing mode correlated to the photographing environmental condition for adjusting the flight condition of the unmanned aerial vehicle and for photographing the photographing object of the unmanned aerial vehicle.

In some embodiments, when the photographing object corresponding to at least one photographing model of the unmanned aerial vehicle is human and the photographing environmental condition is a condition that a light source directly faces the photographing object, for the step of (S310), after identifying the person in the captured image of the unmanned aerial vehicle and detecting that the light source directly faces the photographing object, the photographing mode correlated to the photographing environmental condition is adopted for adjusting the flight condition of the unmanned aerial vehicle and for photographing the photographing object of the unmanned aerial vehicle. For example, the unmanned aerial vehicle is controlled to fly to the photographing object in a fast speed for photographing at a near distance.

FIG. 4 is a flow chart of a fourth photographing method of the unmanned aerial vehicle according to the preferred embodiment of the present invention. As shown in FIG. 4, the photographing model of the unmanned aerial vehicle further includes a photographing object condition correlated to the photographing mode of the unmanned aerial vehicle.

In some embodiments, the fourth photographing method of the unmanned aerial vehicle comprises steps of:

(S410), when the photographing object corresponding to at least one photographing model of the unmanned aerial vehicle is identified to exist in the captured image of the unmanned aerial vehicle and a current photographing object of the unmanned aerial vehicle is detected to meet the photographing object condition corresponding to at least one photographing model of the unmanned aerial vehicle, adopting the photographing mode correlated to the photographing object condition for adjusting the flight condition of the unmanned aerial vehicle and for photographing the photographing object of the unmanned aerial vehicle.

In some embodiments, when the photographing object corresponding to at least one photographing model of the unmanned aerial vehicle is human and the photographing object condition is a condition that a movement speed of the person is lower than 1 m/s, for the step of (S410), after identifying the person in the captured image of the unmanned aerial vehicle and detecting that the movement speed of the person is lower than 1 m/s, the photographing mode correlated to the photographing object condition is adopted for adjusting the flight condition of the unmanned aerial vehicle and for photographing the photographing object of the unmanned aerial vehicle. For example, the unmanned aerial vehicle is controlled to directly face the person, and a shutter time is decreased, for continuously photographing the images.

With the FIGS. 1-4, the photographing methods of the unmanned aerial vehicle provided by the preferred embodiment of the present invention are described in detail as above. Photographing devices of the unmanned aerial vehicle, the unmanned aerial vehicle and the ground control device provided by the preferred embodiment of the present invention are described in detail with FIGS. 5-10 as follows.

Figure 5:
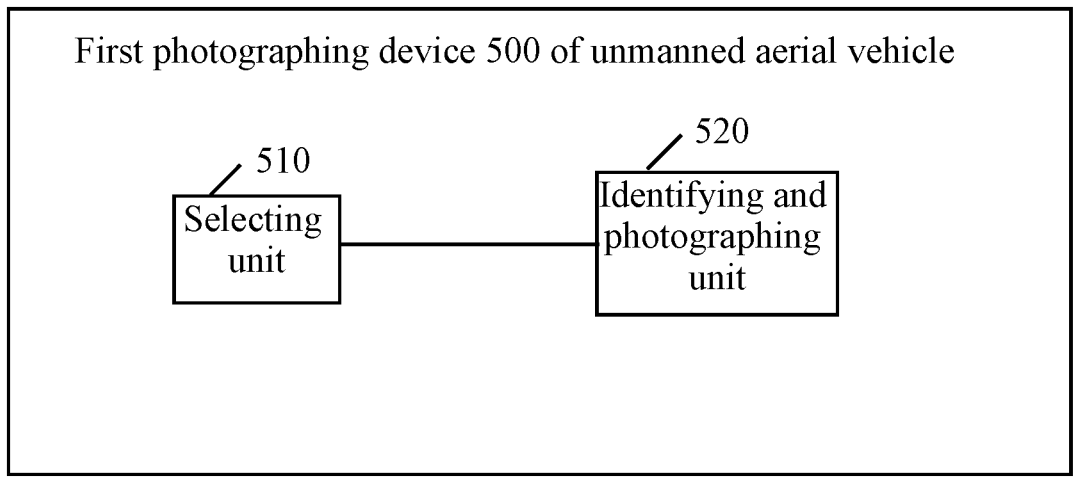
FIG. 5 is a sketch structural view of a first photographing device of the unmanned aerial vehicle according to the preferred embodiment of the present invention.

FIG. 5 is a sketch structural view of a first photographing device of the unmanned aerial vehicle according to the preferred embodiment of the present invention. As shown in FIG. 5, the first photographing device 500 of the unmanned aerial vehicle comprises a selecting unit 510 and an identifying and photographing unit 520.

The selecting unit 510 is for selecting the photographing model of the unmanned aerial vehicle, wherein the photographing model of the unmanned aerial vehicle includes the photographing object and the photographing mode of the unmanned aerial vehicle which are correlated with each other.

The identifying and photographing unit 520 is for adjusting the flight condition of the unmanned aerial vehicle with the photographing mode correlated to the photographing object of the unmanned aerial vehicle when the photographing object corresponding to the photographing model of the unmanned aerial vehicle is identified to exist in the captured image of the unmanned aerial vehicle, and for photographing the photographing object of the unmanned aerial vehicle.

According to the preferred embodiment of the present invention, the first photographing device 500 of the unmanned aerial vehicle corresponds to an executive body in the photographing method of the unmanned aerial vehicle, and the function of each unit in the first photographing device 500 of the unmanned aerial vehicle is for realizing the corresponding flow of the method shown in FIG. 1. For brevity, the details are not repeated.

Thus, according to the first photographing device of the unmanned aerial vehicle provided by the preferred embodiment of the present invention, through selecting the photographing model of the unmanned aerial vehicle, including the correlated photographing object and photographing mode of the unmanned aerial vehicle, the unmanned aerial vehicle can identify the collected image during flight; when the object selected to be photographed is identified to exist in the captured image, the photographing mode correlated to the photographing object of the unmanned aerial vehicle is adopted for adjusting the flight condition of the unmanned aerial vehicle and for photographing the photographing object of the unmanned aerial vehicle. When photographing of the unmanned aerial vehicle is manually controlled, the photographing object requires to be selected by experience, and thus an image of ideal effect is difficult to be captured; through the present invention, the above problem is avoided. Moreover, compared with the manual control, the control accuracy of the present invention is greatly increased, thereby improving the photographing effect of the image.

Figure 6:
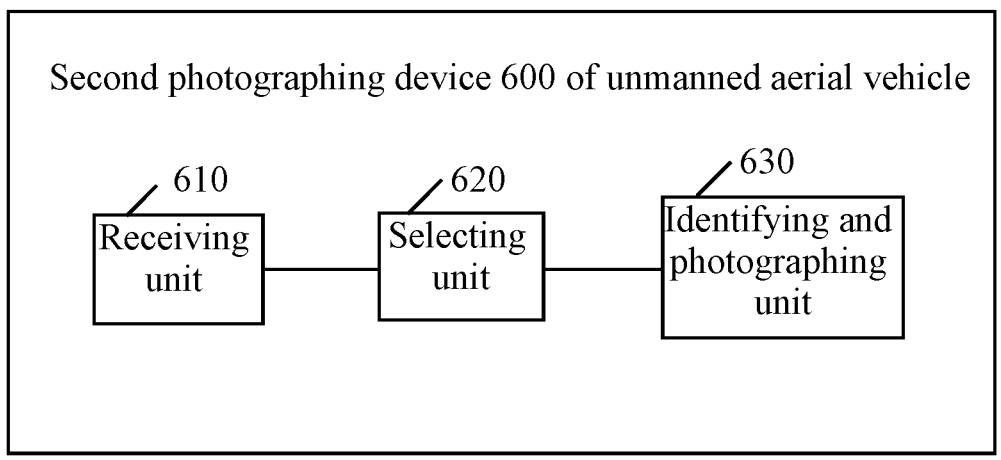
FIG. 6 is a sketch structural view of a second photographing device of the unmanned aerial vehicle according to the preferred embodiment of the present invention.

FIG. 6 is a sketch structural view of a second photographing device of the unmanned aerial vehicle according to the preferred embodiment of the present invention. As shown in FIG. 6, the second photographing device 600 of the unmanned aerial vehicle comprises a receiving unit 610, a selecting unit 620 and an identifying and photographing unit 630.

The receiving unit 610 is for receiving the photographing instruction of the unmanned aerial vehicle, wherein the photographing instruction of the unmanned aerial vehicle includes at least one photographing model identifier of the unmanned aerial vehicle.

The selecting unit 620 is for selecting at least one photographing model of the unmanned aerial vehicle in the photographing model library of the unmanned aerial vehicle according to at least one photographing model identifier of the unmanned aerial vehicle, wherein: the photographing model of the unmanned aerial vehicle includes the photographing object and the photographing mode of the unmanned aerial vehicle which are correlated with each other; and various photographing models of the unmanned aerial vehicle are recorded in the photographing model library of the unmanned aerial vehicle.

The identifying and photographing unit 630 is for adjusting the flight condition of the unmanned aerial vehicle with the photographing mode correlated to the photographing object of the unmanned aerial vehicle when the photographing object corresponding to at least one photographing model of the unmanned aerial vehicle is identified to exist in the captured image of the unmanned aerial vehicle, and for photographing the photographing object of the unmanned aerial vehicle In some embodiments, the photographing model of the second photographing device 600 of the unmanned aerial vehicle includes one photographing object of the unmanned aerial vehicle and multiple photographing modes corresponding to the photographing object of the unmanned aerial vehicle.

In some embodiments, the photographing instruction of the unmanned aerial vehicle includes at least one photographing model identifier of the unmanned aerial vehicle arranged in the predetermined sequence. The selecting unit 620 is further for selecting at least one photographing model of the unmanned aerial vehicle in the photographing model library of the unmanned aerial vehicle according to at least one photographing model identifier of the unmanned aerial vehicle arranged in the predetermined sequence.

In some embodiments, the photographing model of the unmanned aerial vehicle further includes a photographing environmental condition correlated to the photographing mode of the unmanned aerial vehicle.

In some embodiments, the identifying and photographing unit 520 is further for adopting the photographing mode correlated to the photographing object of the unmanned aerial vehicle when the photographing object corresponding to the photographing model of the unmanned aerial vehicle is identified to exist in the captured image, so that the unmanned aerial vehicle automatically adjusts the flight condition, photographs the photographing object of the unmanned aerial vehicle and collects the audio data.

Figure 7:
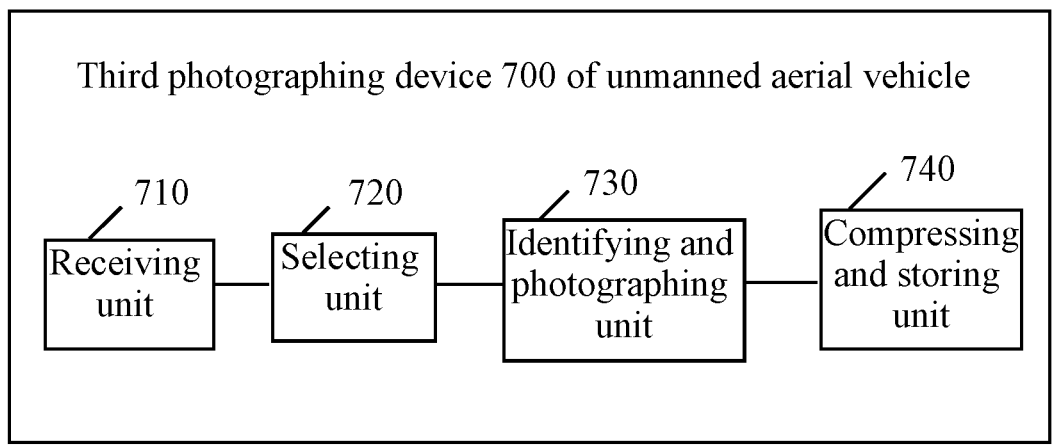
FIG. 7 is a sketch structural view of a third photographing device of the unmanned aerial vehicle according to the preferred embodiment of the present invention.

FIG. 7 is a sketch structural view of a third photographing device of the unmanned aerial vehicle according to the preferred embodiment of the present invention. As shown in FIG. 7, the third photographing device 700 of the unmanned aerial vehicle further comprises a compressing and storing unit 740, for storing the image data of the photographing object, captured by the unmanned aerial vehicle, after screening according to the predetermined condition.

In some embodiments, the identifying and photographing unit 520 is further for adopting the photographing mode correlated to the photographing environmental condition to adjust the flight condition of the unmanned aerial vehicle and to photograph the photographing object of the unmanned aerial vehicle when the photographing object corresponding to at least one photographing model of the unmanned aerial vehicle is identified to exist in the captured image of the unmanned aerial vehicle and a current photographing environmental condition of the unmanned aerial vehicle is detected to meet the photographing environmental condition corresponding to at least one photographing model of the unmanned aerial vehicle.

In some embodiments, the photographing model of the unmanned aerial vehicle further includes the photographing object condition correlated to the photographing mode of the unmanned aerial vehicle.

In some embodiments, the identifying and photographing unit 520 is further for adopting the photographing mode correlated to the photographing object condition to adjust the flight condition of the unmanned aerial vehicle and to photograph the photographing object of the unmanned aerial vehicle when the photographing object corresponding to at least one photographing model of the unmanned aerial vehicle is identified to exist in the captured image of the unmanned aerial vehicle and a current photographing object of the unmanned aerial vehicle is detected to meet the photographing object condition corresponding to at least one photographing model of the unmanned aerial vehicle.

Figure 8:
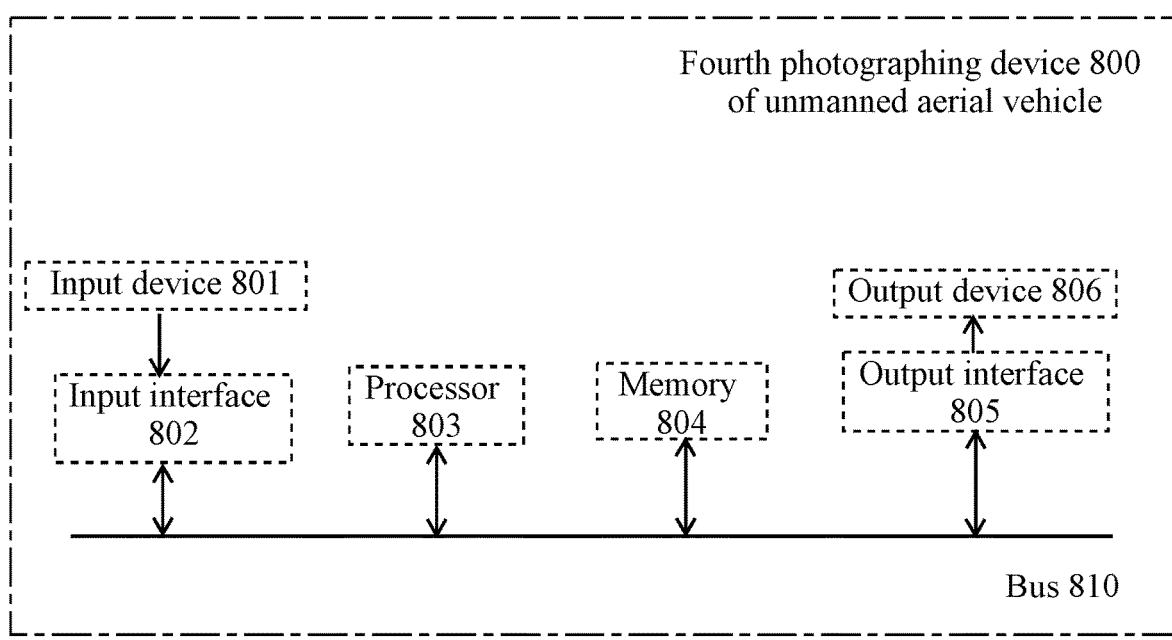
FIG. 8 is a sketch structural view of a fourth photographing device of the unmanned aerial vehicle according to the preferred embodiment of the present invention.

FIG. 8 is a sketch structural view of a fourth photographing device of the unmanned aerial vehicle according to the preferred embodiment of the present invention. As shown in FIG. 8, the fourth photographing device 800 of the unmanned aerial vehicle comprises a memory 804 and a processor 803, wherein: the memory 804 is for storing an executable program code; and the processor 803 is for reading the executable program code stored in the memory 804 and executing the above photographing method of the unmanned aerial vehicle.

Thus, according to the fourth photographing device of the unmanned aerial vehicle provided by the preferred embodiment of the present invention, through selecting the photographing model of the unmanned aerial vehicle, including the correlated photographing object and photographing mode of the unmanned aerial vehicle, the unmanned aerial vehicle can identify the collected image during flight; when the object selected to be photographed is identified to exist in the captured image, the photographing mode correlated to the photographing object of the unmanned aerial vehicle is adopted for adjusting the flight condition of the unmanned aerial vehicle and for photographing the photographing object of the unmanned aerial vehicle. When photographing of the unmanned aerial vehicle is manually controlled, the photographing object requires to be selected by experience, and thus an image of ideal effect is difficult to be captured; through the present invention, the above problem is avoided. Moreover, compared with the manual control, the control accuracy of the present invention is greatly increased, thereby improving the photographing effect of the image.

In some embodiments, the fourth photographing device 800 of the unmanned aerial vehicle further comprises an input device 801, an input interface 802, an output interface 805 and an output device 806, wherein: the input interface 802, the processor 803, the memory 804, and the output interface 805 are connected with each other through a bus 801; the input device 801 and the output device 806 are connected with the bus 810 respectively through the input interface 802 and the output interface 805, so as to further connect with other components of the device 800.

In some embodiments, the output interface and the input interface can be represented by I/O interface. Particularly, the input device 801 receives the external input information and transmits the input information to the processor 803 through the input interface 802. For example, the input device receives the photographing instruction of the unmanned aerial vehicle, wherein the photographing instruction of the unmanned aerial vehicle includes at least one photographing model identifier of the unmanned aerial vehicle.

In some embodiments, the processor 803 processes the input information based on the computer executable program code or instruction stored in the memory 804, so as to generate the output information. For example, the processor 803 executes following steps of: selecting at least one photographing model of the unmanned aerial vehicle in the photographing model library of the unmanned aerial vehicle according to at least one photographing model identifier of the unmanned aerial vehicle, wherein the photographing model of the unmanned aerial vehicle includes the photographing object and the photographing mode of the unmanned aerial vehicle which are correlated with each other; and various photographing models of the unmanned aerial vehicle are recorded in the photographing model library of the unmanned aerial vehicle. When the photographing object corresponding to at least one photographing model of the unmanned aerial vehicle is identified to exist in the captured image of the unmanned aerial vehicle, the photographing mode correlated to the photographing object of the unmanned aerial vehicle is adopted for adjusting the flight condition of the unmanned aerial vehicle and for photographing the photographing object of the unmanned aerial vehicle. The output information is temporarily or permanently stored in the memory 804, and then is transmitted to the output device 806 through the output interface 805 when necessary. The output device 806 transmits the output information to the external of the device 800. For example, the output information is displayed at the display device or uploaded to the cloud.

The above units which are illustrated as separate components can be or cannot be separated physically; and the components displayed as units can be or cannot be physical units, that is to say the units can be located at the same position or distributed to multiple network units. According to actual requirements, part of or all of the units are selected for accomplishing the object of the preferred embodiment of the present invention.

FIG. 9 is a structural sketch view of the unmanned aerial vehicle according to the preferred embodiment of the present invention. As shown in FIG. 9, the unmanned aerial vehicle 900 comprises one of the first photographing device 500, the second photographing device 600, the third photographing device 700 and the fourth photographing device 800.

Thus, according to the unmanned aerial vehicle provided by the preferred embodiment of the present invention, through selecting the photographing model of the unmanned aerial vehicle, including the correlated photographing object and photographing mode of the unmanned aerial vehicle, the unmanned aerial vehicle can identify the collected image during flight; when the object selected to be photographed is identified to exist in the captured image, the photographing mode correlated to the photographing object of the unmanned aerial vehicle is adopted for adjusting the flight condition of the unmanned aerial vehicle and for photographing the photographing object of the unmanned aerial vehicle. When photographing of the unmanned aerial vehicle is manually controlled, the photographing object requires to be selected by experience, and thus an image of ideal effect is difficult to be captured; through the present invention, the above problem is avoided. Moreover, compared with the manual control, the control accuracy of the present invention is greatly increased, thereby improving the photographing effect of the image.

FIG. 10 is a structural sketch view of the ground control device for the unmanned aerial vehicle according to the preferred embodiment of the present invention. As shown in FIG. 10, the ground control device 1000 for the unmanned aerial vehicle comprises one of the first photographing device 500, the second photographing device 600, the third photographing device 700 and the fourth photographing device 800.

Thus, according to the ground control device provided by the preferred embodiment of the present invention, through selecting the photographing model of the unmanned aerial vehicle, including the correlated photographing object and photographing mode of the unmanned aerial vehicle, the unmanned aerial vehicle can identify the collected image during flight; when the object selected to be photographed is identified to exist in the captured image, the photographing mode correlated to the photographing object of the unmanned aerial vehicle is adopted for adjusting the flight condition of the unmanned aerial vehicle and for photographing the photographing object of the unmanned aerial vehicle. When photographing of the unmanned aerial vehicle is manually controlled, the photographing object requires to be selected by experience, and thus an image of ideal effect is difficult to be captured; through the present invention, the above problem is avoided. Moreover, compared with the manual control, the control accuracy of the present invention is greatly increased, thereby improving the photographing effect of the image.

What is claimed is:

1. A photographing method of an unmanned aerial vehicle, comprising steps of:
receiving a photographing instruction of the unmanned aerial vehicle, wherein the photographing instruction of the unmanned aerial vehicle includes at least one photographing model identifier of the unmanned aerial vehicle;
according to at least one photographing model identifier of the unmanned aerial vehicle, selecting at least one photographing model of the unmanned aerial vehicle in a photographing model library of the unmanned aerial vehicle, wherein various photographing models of the unmanned aerial vehicle are recorded in the photographing model library of the unmanned aerial vehicle; and each photographing model of the unmanned aerial vehicle includes a photographing object and a photographing mode of the unmanned aerial vehicle which are correlated with each other; and
when the photographing object corresponding to at least one photographing model of the unmanned aerial vehicle is identified to exist in a captured image, adopting the photographing mode correlated to the photographing object of the unmanned aerial vehicle for adjusting a flight condition and for photographing the photographing object of the unmanned aerial vehicle;
wherein: the photographing instruction of the unmanned aerial vehicle includes at least one photographing model identifier of the unmanned aerial vehicle arranged in a predetermined sequence;
the step of "according to at least one photographing model identifier of the unmanned aerial vehicle, selecting at least one photographing model of the unmanned aerial vehicle in a photographing model library of the unmanned aerial vehicle" particularly comprises steps of: according to at least one photographing model identifier of the unmanned aerial vehicle arranged in the predetermined sequence, selecting at least one photographing model of the unmanned aerial vehicle in the photographing model library of the unmanned aerial vehicle.

2. The photographing method of the unmanned aerial vehicle, as recited in claim 1, wherein one photographing object of the unmanned aerial vehicle corresponds to at least two photographing modes of the unmanned aerial vehicle.

3. The photographing method of the unmanned aerial vehicle, as recited in claim 1, wherein: the step of "when the photographing object corresponding to at least one photographing model of the unmanned aerial vehicle is identified to exist in a captured image, adopting the photographing mode correlated to the photographing object of the unmanned aerial vehicle for adjusting a flight condition and for photographing the photographing object of the unmanned aerial vehicle" particularly comprises steps of: when the photographing object corresponding to at least one photographing model of the unmanned aerial vehicle is identified to exist in the captured image, adopting the photographing mode correlated to the photographing object of the unmanned aerial vehicle; automatically adjusting the flight condition by the unmanned aerial vehicle; photographing the photographing object of the unmanned aerial vehicle, and collecting audio data.

4. The photographing method of the unmanned aerial vehicle, as recited in claim 1, wherein: after the step of "when the photographing object corresponding to at least one photographing model of the unmanned aerial vehicle is identified to exist in a captured image, adopting the photographing mode correlated to the photographing object of the unmanned aerial vehicle for adjusting a flight condition and for photographing the photographing object of the unmanned aerial vehicle", the method further comprises steps of screening image data of the photographing object captured by the unmanned aerial vehicle according to a predetermined condition and then storing.

5. The photographing method of the unmanned aerial vehicle, as recited in claim 1, wherein: each photographing model of the unmanned aerial vehicle further includes a photographing environmental condition correlated to the photographing mode of the unmanned aerial vehicle;

the step of "when the photographing object corresponding to at least one photographing model of the unmanned aerial vehicle is identified to exist in a captured image, adopting the photographing mode correlated to the photographing object of the unmanned aerial vehicle for adjusting a flight condition and for photographing the photographing object of the unmanned aerial vehicle" particularly comprises steps of: when the photographing object corresponding to at least one photographing model of the unmanned aerial vehicle is identified to exist in the captured image of the unmanned aerial vehicle and a current photographing environmental condition of the unmanned aerial vehicle is detected to meet the photographing environmental condition corresponding to at least one photographing model of the unmanned aerial vehicle, adopting the photographing mode correlated to the photographing environmental condition for adjusting the flight condition of the unmanned aerial vehicle and for photographing the photographing object of the unmanned aerial vehicle.

6. The photographing method of the unmanned aerial vehicle, as recited in claim 1, wherein: each photographing model of the unmanned aerial vehicle further includes a photographing object condition correlated to the photographing mode of the unmanned aerial vehicle;

the step of "when the photographing object corresponding to at least one photographing model of the unmanned aerial vehicle is identified to exist in a captured image, adopting the photographing mode correlated to the photographing object of the unmanned aerial vehicle for adjusting a flight condition and for photographing the photographing object of the unmanned aerial vehicle" particularly comprises steps of: when the photographing object corresponding to at least one photographing model of the unmanned aerial vehicle is identified to exist in the captured image of the unmanned aerial vehicle and a current photographing object of the unmanned aerial vehicle is detected to meet the photographing object condition corresponding to at least one photographing model of the unmanned aerial vehicle, adopting the photographing mode correlated to the photographing object condition for adjusting the flight condition of the unmanned aerial vehicle and for photographing the photographing object of the unmanned aerial vehicle.

7. A photographing device of an unmanned aerial vehicle, comprising a memory and a processor, wherein:

the memory is for storing an executable program code; and the processor is for reading the executable program code stored in the memory, so as to execute the photographing method as recited in claim 1.

* * * * *